United States Patent [19]

Stephenson

[11] Patent Number: 4,692,965

[45] Date of Patent: Sep. 15, 1987

[54] SHRIMP PROCESSING METHOD AND DEVICE

[76] Inventor: Fred W. Stephenson, 1131 E. Commercial Blvd., Ft. Lauderdale, Fla. 33334

[21] Appl. No.: 912,988

[22] Filed: Sep. 29, 1986

Related U.S. Application Data

[63] Continuation-in-part of Ser. No. 715,669, Mar. 25, 1985, abandoned.

[51] Int. Cl.$^4$ ............................................. A22E 29/02
[52] U.S. Cl. ........................................... 17/48; 17/51; 17/71
[58] Field of Search ..................... 17/48, 71, 72, 73, 51

[56] References Cited

U.S. PATENT DOCUMENTS

| | | | |
|---|---|---|---|
| 1,787,835 | 1/1931 | On ............................................. | 17/71 |
| 2,978,334 | 4/1961 | Lapeyre ............................... | 17/71 X |
| 3,309,734 | 3/1967 | Stephenson .......................... | 17/71 X |
| 3,465,383 | 9/1969 | Willis et al. .......................... | 17/48 X |
| 3,576,047 | 4/1971 | Willis ..................................... | 17/48 |
| 3,696,466 | 10/1972 | Letchworth ........................... | 17/71 |
| 4,016,625 | 4/1977 | Mitchell ................................. | 17/71 |
| 4,307,492 | 12/1981 | Braginsky et al. ................. | 17/48 X |

Primary Examiner—Willie G. Abercrombie
Attorney, Agent, or Firm—Jack E. Dominik; Richard M. Saccocio

[57] ABSTRACT

A combination which in sequence utilizes a singulator, an orientor, a decapitator, and a separator. The singulator is a vibratory scoop-like device which causes shrimps delivered to the processor to begin to move single file towards the exit of the singulator. Thereafter the shrimp move into the orientor which has a V-shape with a slot at the lower edges with the slot progressively widening down the length of the orientor. The shrimp will invariably hang tail down, and finally when the slot becomes wider than the shrimp they drop in tail-down fashion into the upper portion of the decapitator. The decapitator, in turn, has a vertical velocity head formed in a vertical feeder tube which intersects with a transverse flow of fluid and the shrimp "turns the corner" at a fulcrum, and is decapitated at that point. Thereafter the tails and heads are directed to a seaprator by means of a decelerator pipe. The decelerator by the use of a rake and water jets takes advantage of the weight differential between the head and thoracic plate and the tail and separates the same in a hydromechanical fashion. Thereafter the water is filtered and recirculated.

18 Claims, 17 Drawing Figures

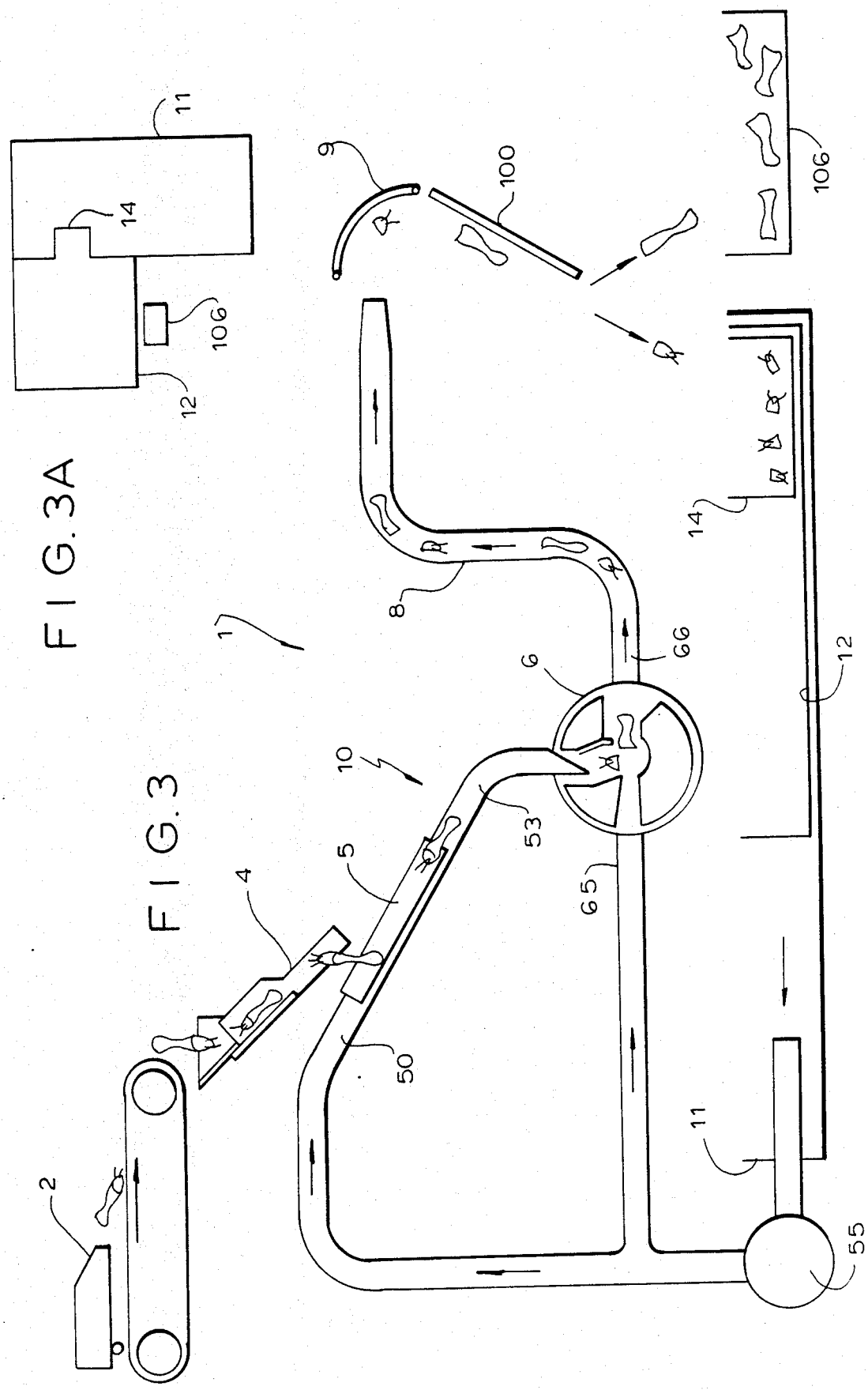

SHRIMP PROCESSING METHOD AND DEVICE

CROSS-REFERENCE TO RELATED APPLICATIONS

This application is a continuation-in-part of application Ser. No. 715,669 filed Mar. 25, 1985 entitled "Shrimp Deheading Device" by Fred Stephenson, now abandoned.

BACKGROUND OF THE INVENTION

1. Field of the Invention

The present invention is directed to the processing of shrimp, and more particularly to a device and method which will process freshly chill-killed shrimp to decapitate the same and remove the thoracic plate as well as the pleopods so that the balance can be frozen or otherwise processed.

2. Summary of the Prior Art

Shrimp after they are caught must be decapitated within a relatively short period of time, or otherwise under even the best of conditions including freezing, decay can begin. The decapitation of shrimp has been largely a hand process normally eschewed by most human beings. Also the decapitation of shrimp by even a skilled operator takes considerable time.

These problems were realized and addressed by applicant earlier, and resulted in U.S. Pat. Nos. 3,309,731 and 3,408,686. Both patents were directed to a device for decapitating shrimp by means of bending the shrimp quickly around an edge or anvil as the shrimp's transition from a vertical tube with slow speed fluid to a horizontal tube with high speed fluid.

One of the drawbacks of the prior-art devices shown and described in U.S. Pat. Nos. 3,309,731 and 3,408,686 was the inability to positively orient the shrimp at all times so that they were presented to the decapitating chamber tail first, and more particularly with the legs facing the edge or anvil and the outer shell remote from the edge or anvil. Also the prior-art devices were susceptible of jams, and difficult to clean out quickly. Finally, according to the prior art, the heads and tails were separated through an essentially flotation method which required considerable space, and also was not totally reliable.

Additional prior art is exemplified by U.S. Pat. No. 3,576,047. In that patent, however, no means is provided for backwashing the shrimp in the event of a clog, and all of the processing presupposes that the shrimp have been put into individual carrier troughs referred to as distributor chutes 14. Similarly, U.S. Pat. No. 4,054,970 shows V-shaped members, but not the process of orienting all tail first prior to hydraulic decapitation. Neither of U.S. Pat. Nos. 3,576,047 or 4,054,970 disclose a total hydraulic technique for singulating and orienting.

SUMMARY OF THE INVENTION

The present invention is directed to a combination which in sequence utilizes a singulator, an orientor, a decapitator, and a separator. The singulator is a vibratory scoop-like device which causes shrimps delivered to the processor to begin to move single file towards the exit of the singulator. Thereafter the shrimp move into the orientor which has a V-shape with a slot at the lower edges with the slot progressively widening down the length of the orientor. the shrimp will invariably hang tail down, and finally when the slot becomes wider than the shrimp they drop in tail-down fashion into the upper portion of the decapitator. The decapitator, in turn, has a vertical velocity head formed in a vertical feeder tube which intersects with a transverse flow of fluid and the shrimp "turns the corner" at a fulcrum, and is decapitated at that point. Thereafter the tails and heads are directed to a separator by means of a decelerator pipe. the decelerator by the use of a rake and water jets takes advantage of the weight differential between the head and thoracic plate and the tail and separates the same in a hydromechanical fashion. Thereafter the water is filtered and recirculated. The method of the invention looks to the sequence of processing shrimp by first orienting the same in a tail-down fashion, and thereafter passing them from a slow moving fluid into a rapidly moving fluid and fulcruming the body of the shrimp adjacent the intersection of the two fluids to the end that the shrimp is whipped around and decapitated. Thereafter the heads are separated from the tails by directing the same against a rake through which the water passes. Then a transverse spray of water across the corrugated board removes the head. The method employed by the separator first directs the entire effluent against a vertical rake in order to get the water out of the flow. Thereafter the heads and tails drop down an angled corrugator which decelerates them and permits passing horizontal jets of water to pick up the lighter heads and thoracic plate and move them transversely across the corrugated material while the more dense and slippery tails slide right down the corrugated wall and into a chute thereby arriving fully processed. The heads and thoracic plate fall to the bottom of the processor and then into a large basket having pour sidewalls which retains all of the heads and thoracic plates while the water passes into the reservoir for filtration and re-use.

In an alternate embodiment apparatus and a method for processing shrimp which vary substantially in size, such as between twenty-one count and sixty count (count being the number of shrimp per pound). The decapitator portion of the above-described embodiment is modified so that various sizes of shrimp may be decapitated with equal efficiency. A vertical feeder tube comprises a channel formed by upper left and right inserts within the decapitator apparatus. The vertical feeder tube channel is tapered in size from top to bottom to assure easy entrance of the shrimp passing therethrough and to maintain the proper orientation of the shrimp therewithin. The opening at the exit of the feeder tube channel is sized to insure that the shrimp is properly positioned relative to the decapitating fulcrum. Clearance recesses within the vertical feeder tube channel provides relief for the feelers or horns of the shrimp as they pass through the vertical channel. These recesses also provide for and maintain proper orientation of the shrimp as they are directed towards the fulcrum.

In view of the foregoing it is a principal object of the present invention to provide a shrimp processor which is essentially all hydraulic and in which the shrimp are positively oriented for presentation to the decapitator portion thereby maximizing the yield.

A further object of the present invention is to provide a separator for the heads and thoracic plate from the shrimp body portion so that only the shrimp body portion or tail will be in the output container.

Yet another object of the present invention is to provide a separator for the heads and tails of the processed shrimp which is gentle on the tails and therefore will not destroy them.

Still another object of the present invention looks to the provision of control for accelerating and decelerating the rate at which the shrimp pass through the decapitator which can accommodate shrimpt that have been dead for twenty-four hours or shrimp freshly killed by feeding them at different rates.

Also another object of the present invention is to provide a means for automatically addressing a jamming or clogging.

Yet another and important object of the present invention is to process the subject shrimp in a fashion where additional meat is left on the tail as contrasted with manually decapitating the shrimp.

A further object of the present invention is to provide for processing of shrimp which vary greatly in size such that efficient decapitating of the shrimp is efectuated regardless of the size of the shrimp with additional meat being left on the tail.

BRIEF DESCRIPTION OF THE DRAWINGS

Further objects and advantages of the present invention will become apparent as the following description of an illustrative embodiment, and an alternative in part, proceeds taken in conjunction with the accompanying drawings, in which:

FIG. 3 is a diagrammatic view of the entire process and a flowsheet identifying the fluid flow in the processor;

FIG. 3a is a plan view in reduced scale showing diagrammatically the two fluid reservoirs;

DETAILED DESCRIPTION OF THE PREFERRED EMBODIMENTS

Figure 1:
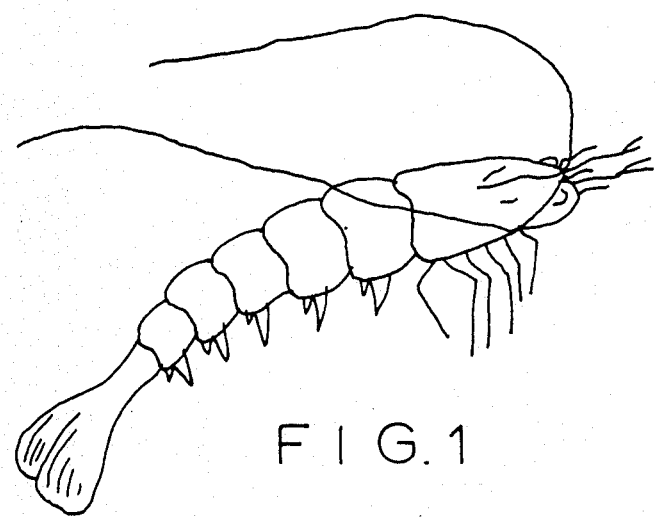
FIG. 1 is a perspective view of a typical shrimp in approximately full scale.

Prior to discussing the process, the basic anatomy of a shrimp should be understood. As shown in FIG. 1, the shrimp extends from tail to head, and normally has long feelers and long legs. The body is covered with a shell. The body portion contains the delectable meat, and the head portion while brimming with nutrients, is considered unpalatable. The head portion is susceptible of decay due to bacterial action, and accordingly because it does constitute 40% of the total shrimp and a potential for decay, it is normally removed prior to freezing. It is possible to blast freeze a shrimp with the head on but it must be held at temperatures close to −30° F. which is costly. Furthermore, it does not make sense to store 40% of what will be ultimately discarded as waste. Therefore good food handling requires removal of the head.

Figure 2B:
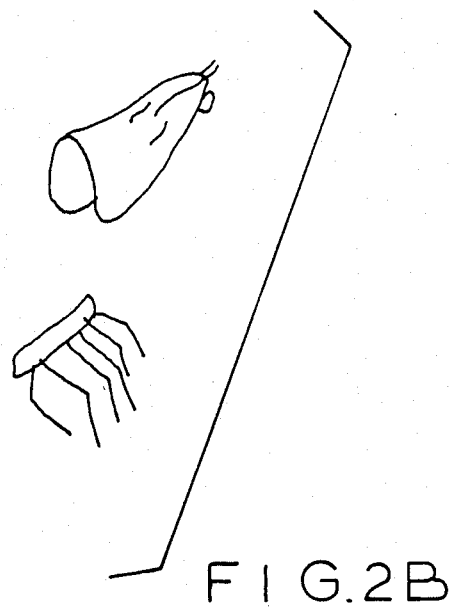
FIG. 2b is a somewhat diagrammatic view of the waste showing the head, the thoracic plate, and the pleopods.
Figure 2A:
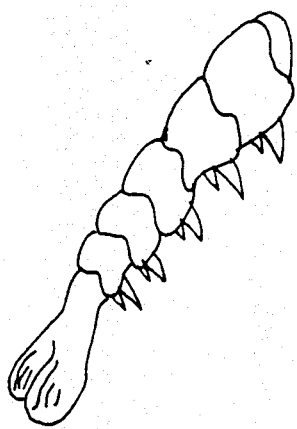
FIG. 2a is a perspective view of the subject shrimp after it is processed showing the tail, the pleo pods, and a bonus amount of meat which remains on the tail because of the processing.

As shown in FIG. 2a, the tail portion including the meat and the pleopods or small swimming fins which can be separated from the head. Utilizing the process of the present invention between 5% to 10% additional meat is salvaged with the tail and is shown as such to the upper right-hand corner of the tail where this extra piece of meat extends. In FIG. 2b, there is shown that portion which is stripped away from the shrimp. This includes the head itself, as well as the thoracic plate from which the longer legs or periopods depend. In the practice of the present invention, the head and thoracic plate is separated from the tail, and the bonus is retained by the tail. The head and thoracic plate, sometimes together, are then separated into a filtered waste container, while the tail portion goes into a packing trough from which the processed tails are removed and then boxed, and frozen for shipment or otherwise processed.

Figure 4:
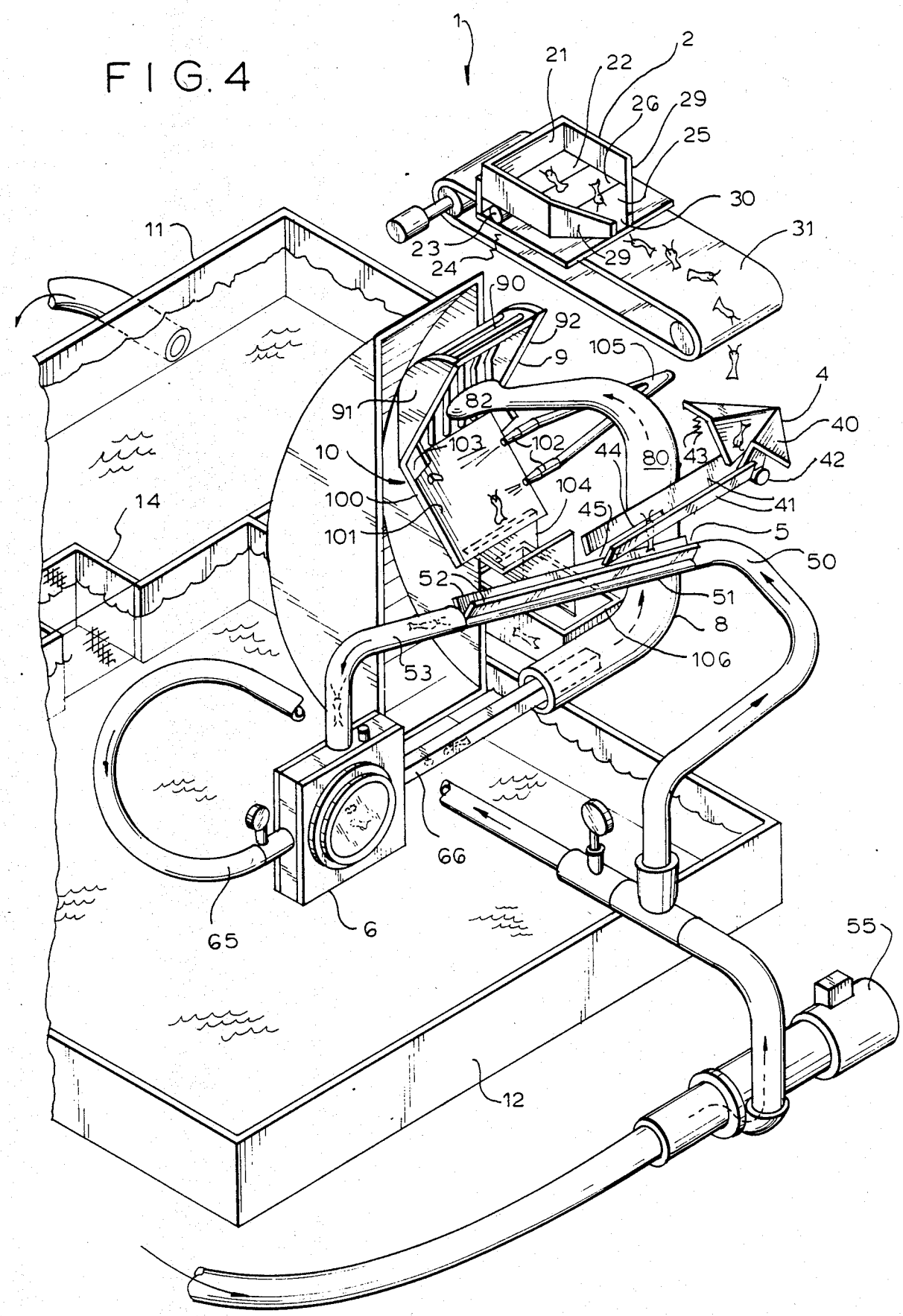
FIG. 4 is a perspective partially broken view showing the actual processor and its elements in their operating relationship.

Referring now to FIG. 3 it will be seen that the process commences with the utilization of a singulator 2. The shrimp emerge from the singulator 2 which causes the shrimp to get in single file. The shrimp then drop onto a conveyor and are then transferred to an indexer/orienter 4. The purpose of the indexer 4 is to orient all of the shrimp with the tails down which is by far the best presentation to the velocity head 6 which is the decapitator. Thereafter the severed heads and tails pass up throug a decelerator pipe 8 which reduces the speed of the processing water and then directs the water, heads, and tails into the dewatering rake assembly 9. The purpose of the dewatering rake assembly 9 is to pass all of the fluid into a reservoir for reprocessing, while arresting the travel of the mixed heads and tails. As shown in FIG. 4, the rake assembly 9 includes the rake 90, side deflectors 91, and the support 92.

Thereafter the heads and tails pass down onto the separator assembly 10 and as more specifically shown in FIG. 4 onto the separator plate 100 which is covered by a corrugated mat 101. Transverse water jets 102 are provided which dirct a fan-like spray transversely across the corrugated mat 101 of the separator plate 100. Because the tails are heavier, and "streamlined" the transverse spray does not effect them and they continue to drop straight down the separator plate 100 to chute 104. On the other hand, the heads being light in weight and irregular in shape are engaged by the transverse spray, and separated laterally and diverted directly into the effluent tank. Thereafter, as shown in FIG. 3, the heads fall into a porous-type basket 14, and the water then goes into the processing tank 11 while the heads remain in the basket 14 to be removed from time to time and further processed. The tails fall into product basket 106. FIG. 3a shows the location of the basket 14 in recirculating water tank 11.

As shown more specifically to FIG. 4, the physical arrangements of the various elements of the shrimp processor 1 are shown in greater detail. There it will be seen that the singulator 2 begins with a singulator tank 21 having a corrugated mat 22 on its bottom 25. The entire singulator bottom 25 is activated by a vibrator 23 which acts against a spring mount 24 in order to constantly shake the singulator. The singulator bottom 25 has two drop-off stations 26 which lead to a chute portio 28 having sidewalls 29 directed to the opening 30. As the shrimp pass out the opening 30, they pass onto a conveyor belt 31, but at all times in single file as shown. While the invention is not intended to be limited by dimensions, the larger the singulator 2, the greater its capacity. This may be determined emperically to feed enough shrimp to achieve the desired capacity of 300 pounds per hour.

Figure 6:
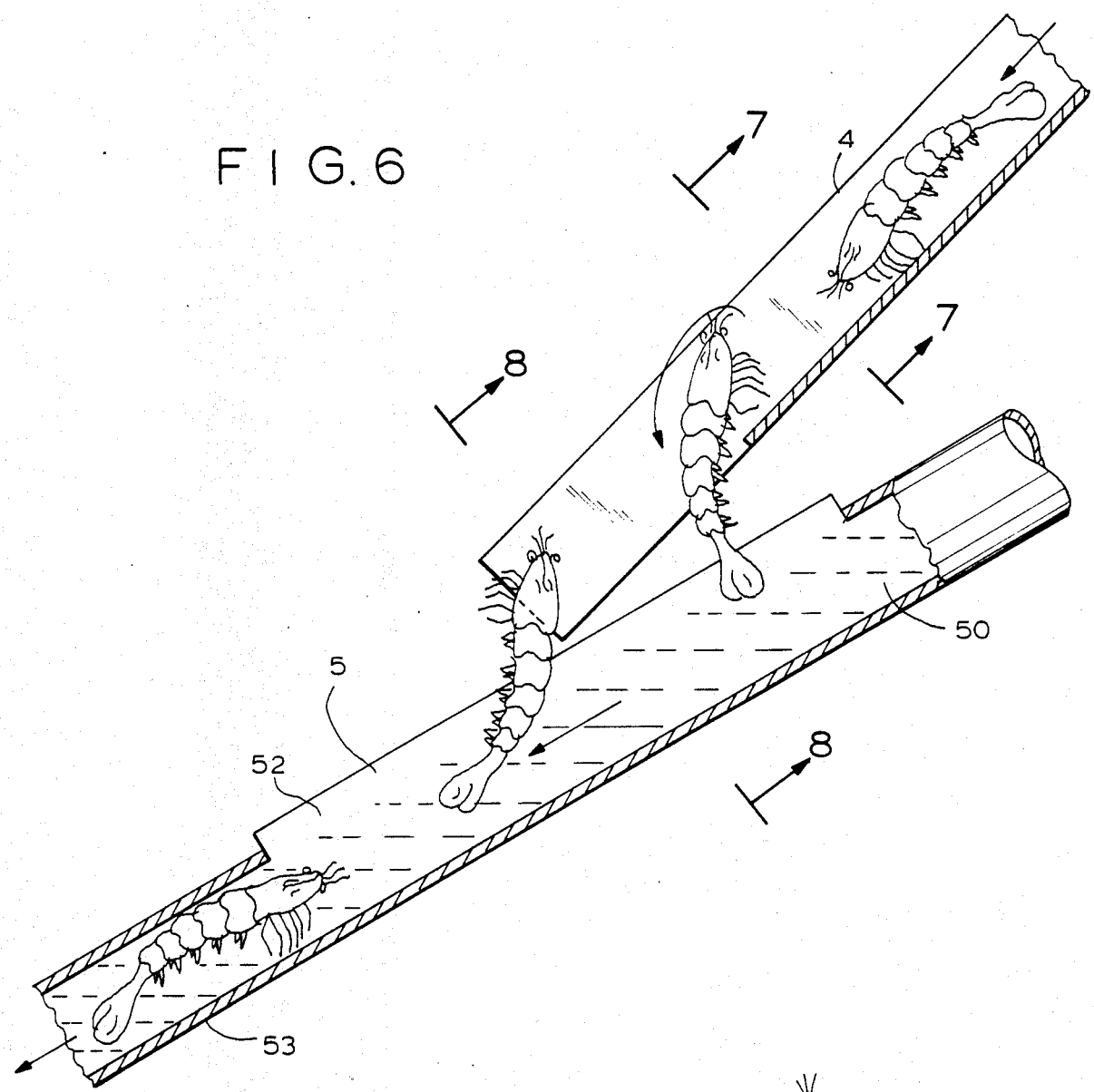
FIG. 6 is a front elevation of the orientor which is fed by the singulator.
Figure 7:
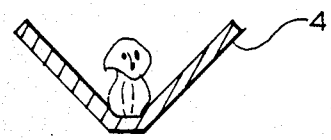
FIG. 7 is a transverse sectional view of the feed portion of the singulator.
Figure 8:
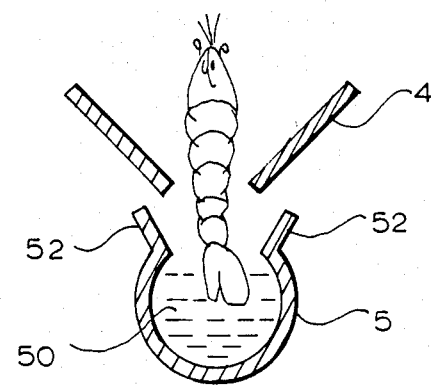
FIG. 8 is a transverse sectional view of the orientor showing the ever widening slot which orients the shrimp tail down.

Thereafter the shrimp drop on the indexer/orientor 4 by first engaging the indexer pan 40. Thereafter the shrimp pass through the diverging beams 41 of the indexer pan 40. The indexer/orienter 4 is actuated by a vibrator 42, and also is spring mounted. As the shrimp pass forwardly they ultimately drop into the slot 44 which diverges to the far end opening 45 positively orienting the shrimp with their tails down. Thereafter the shrimp pass into the raceway 5 which is supplied with a raceway water supply 50 and then passes through the channel 51. Deflectors 52 make certain that the shrimp continue to present themselves tail first when entering the 80° long sweep elbow 53 on their way to the velocity head 6 (decapitator). The water is fed by pump 55. The movement and orientation of the shrimp due to raceway 5 is shown in more detail in FIGS. 6, 7 and 8. FIG. 6 shows a shrimp coming head first down the indexer 4 being oriented to a tail first position. FIG. 7 further illustrates the head first orientation in the indexer 4 and FIG. 8 the shrimp oriented tail first in the open V channel of the indexer 4.

Figure 5:
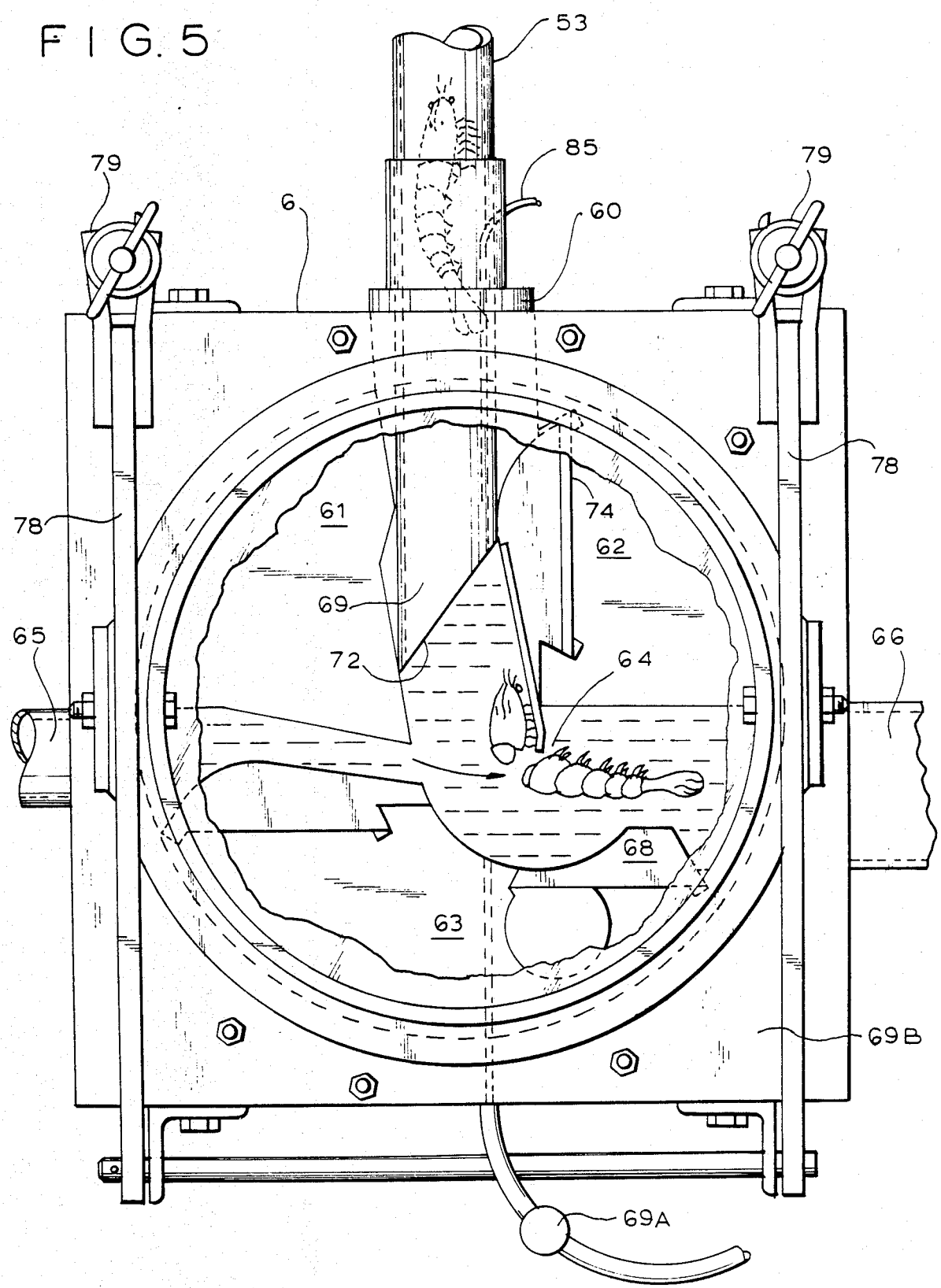
FIG. 5 is a partially broken front elevation of the decapitator portion of the processor and illustrating diagrammatically the purge system as well as the flow control.

Turning now to FIG. 5, the action of the velocity head decapitator 6 may be better understood. To be noted is the shrimp dropping tail first into the velocity head vertical input 60. This is normally a tube, with a surrounding member. The 80° long sweep elbow 53 is cut on a bias at its bottom end 72. The decapitator 6 is made up in the configuration of a porthole, having a window on each side, both of which sandwich specific inserts which define the hydraulic passageway. For example, the velocity head vertical input 60 is sandwiched inbetween the upper left insert 61 and the upper right insert 62. The bottom insert 63 is a single piece and defines the passageway for the more rapidly moving horizontal stream of fluid. The fulcrum 64 is positioned at the junction between the fast moving horizontal stream and the vertical stream. The upper right insert 62 is reinforced by a beam 74. The main water input pipe 65 feeds into the input water deflector 67 which is defined by opposed portions of the upper left insert 61 and the left-hand portion of the bottom insert 63. As the horizontal water stream traverses the decapitator 6 it passes the flow shaper 68 which directs the tail upwardly and which also coacts to form a venturilike area beneath it. The fluid thereafter passes into the output pipe 66. Noting the details of the vertical feed tube 69, it will be seen that the flow of fluid therethrough can be retarded by means of permitting air to ingress to the venturi portion adjacent the flow shaper 68 as shown. Thus the vertical velocity adjuster 69A can be activated to increase or decrease the rate of flow throug the 80° long sweep elbow 53 and vertical feed tube 69. Where freshly killed shrimp are being processed, a stronger flow is required and the vertical velocity adjustment 69A is virtually shut off in order to maximize the rate of flow and the impact of the shrimp at the fulcrum 64. Conversely when day old shrimp are being processed and they are weaker or less firm, more air may be let in to thereby slow the action and reduce the possibility of damaging the shrimp. The main fram 69B is provided with arms 78 and thumb screw removal assembly 79 so that the windows can be opened for cleaning and processing.

In addition to the control of the air through the vertical velocity adjustment 69A, a purge tube 85 is utilized to present a strem of high velocity water downwardly toward the area of the fulcrum 64. When back pressure is sensed in the main water input pipe 65, a switch automatically actuates a valve which, in turn, permits a jet of water to pass through the purge tube 85 and thereby purge the area around the fulcrum 64 of any clogged heads, tails, or other blockage. Once it is sensed in the main water input pipe 65 that the purging is completed, the jet of water from the purge tube 85 is stopped.

Referring back now to FIG. 4, it will be seen that the heads and tails leave the decapitator 6 and then pass into the decelerator upwardly oriented pipe 80 until they pass to an output spreader 82 at the end of the pipe 80. Immediately thereafter the mixture of heads, tails, and water pass onto the rake assembly 90 where the teeth of the rake permit the water to pass out, but entrap the heads and tails. The heads and tails are prevented from migrating elsewhere by means of the side deflectors 91 which are secured to the rake support 92.

Thereafter the product mix drops onto the separator plate 100. The front portion of the separator plate 100 has a corrugated mat 101, and transverse water jets which have a fan-like spray. The transverse jets 102 are fed by a jet water supply 105. In addition, a lining deflector 103 and a tail chute 104 are provided on the separator plate 100. The effect of the jet of water is to engage the irregularly shaped lightweight head portions and blast them off to the side where they drop into the bottom of the main reservoir 11 from which water drains into filter basket 14 and then into filtration reservoir 12. The shrimp tails, on the other hand, are barely engaged by the jets action and through gravity they just descend downwardly to the tail chute 104 from which they descend into a product basket 106.

First Alternative Embodiment

Figure 9:
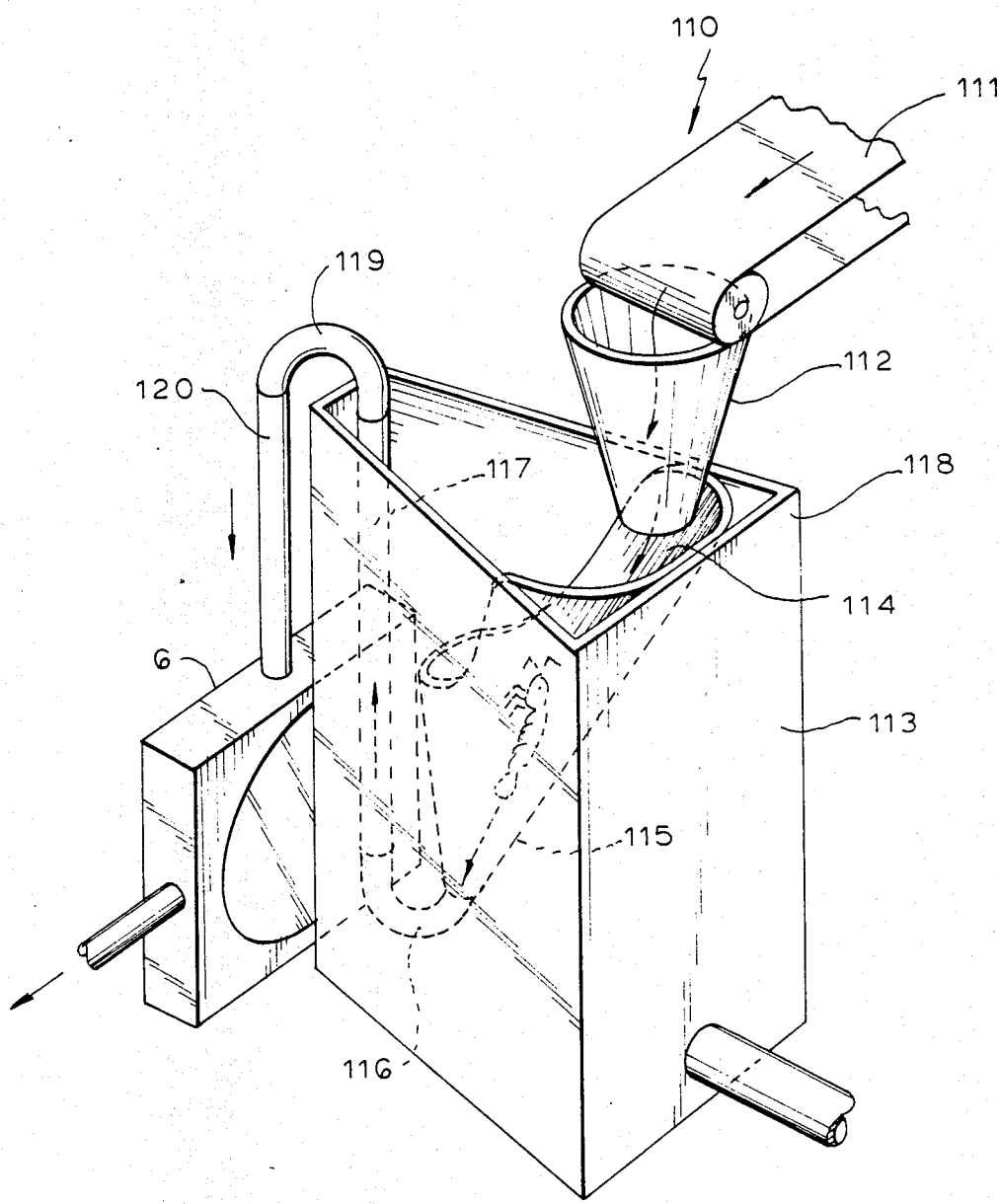
FIG. 9 is a partially broken perspective view showing a further alternative embodiment of a combined hydraulic singulator and orientor.

As shown in FIG. 9, it will be seen that a hydraulic singulator orientor 110 may be substituted for the singulator and orientor. With the hydraulic singulator orientor 110, a conveyor 111 feeds a feeder cone 112 at the upper portion of the unit. The feeder cone 112, in turn, permits the shrimp to drop into a cutaway trap 114 at the upper portion of a main orientor cone 115. The tank 113 is constantly full of fluid to near its top portion 118. The shrimp will invariably sink slowly down the main cone 115 and with their tails oriented downwardly. Thereafter the shrimp goes into the bottom bend 116 of the tube riser 117 which is being vacuum fed from the decapitator 6. The shrimp then goes up the tube riser 116 and around the top bend 119. As it passes the top bend 119 it is further oriented with the legs in the direction where the legs will go around the top bend and down the feed tube 120 facing the fulcrum 64 at the point where the shrimp is engaged and decapitated. This follows because the slike portion of the shrimp is the shell portion of the tail, and it will slide around and engage back-to-back the walls of the bottom bend and top bend. Thereafter the feed tube 120 presents the thus-oriented shrimp directly to the decapitator 6 as previously described.

Second Alternative Embodiment

Figure 10:
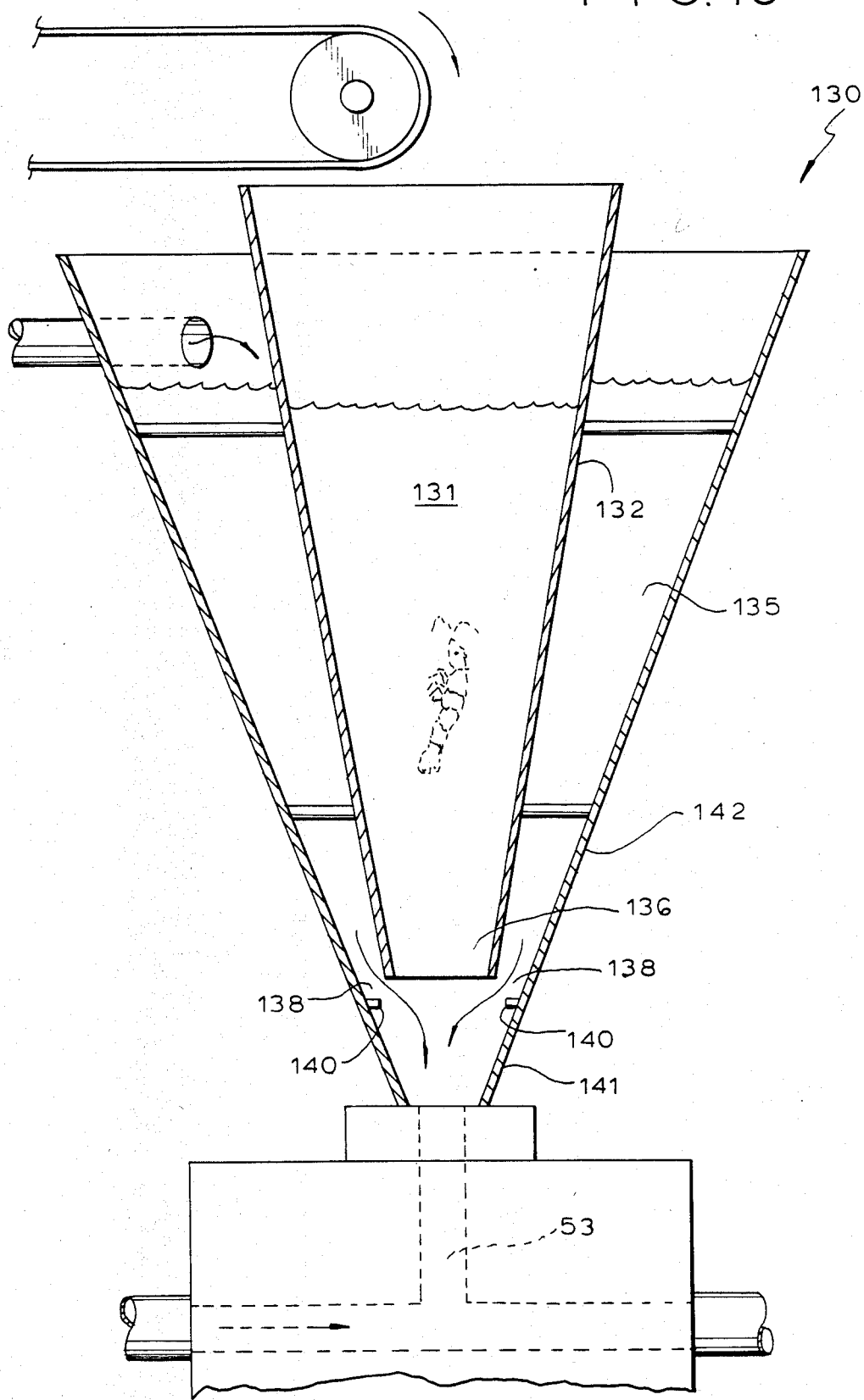
FIG. 10 is a partially broken perspective view showing yet another alternative embodiment of a combined hydraulic singulator and orientor.

The second alternative embodiment hydraulic singulator and orientator 130 is disclosed in FIG. 10. There it will be seen that there is a central sink chamber 131 defined by outer walls 132 which generally taper downwardly. An outer fluid supply chamber 135 surrounds the central sink chamber 131 and is constantly fed by water, and the head of the water in the outer supply chamber 135 constantly exceeds the head of the water in the sink chamber 131 so that the water in the sink chamber 131 remains relatively stagnant therefore permitting the shrimp to naturally orient themselves tail first at a sink rate of approximately 4.6 inches per second. After the shrimp pass through the lower portion 136 of the sink chamber 131, they are quickly picked up by the fluid passing through the bottom annulus 138 at the lower portion 136 of the sink chamber 131 and defined by the flow control baffle 140 which extends centrally from the lower sidewall 141 of the outer container wall 142. In a successful embodiment, the annular baffle 140 defines an annulus 138 of approximately one-half inch between its inner edge and the lower opening portion of the sink chamber 131. By utilizing a one-half inch baffle, and a one inch gap, the half inch annulus is defined. The fluid head of the sinking reservoir being constantly less than the fluid head of the supply reservoir will not permit fluid from the sinking chamber to pass downwardly. This permits all of the shrimp which are fed into the sink chamber 131 to self-orient at the descent rate of 4.6 inches per second and to singulate in fully oriented fashion by the time they reach the bottom of the sink chamber 131. Thereafter the shrimp pass into the velocity head 53 just as shown in the first two embodiments set forth above.

As shown, the outer walls 132 of the sink chamber 131 and the outer walls 142 of the outer fluid supply chamber 135 are essentially an inverted cone. Just as readily, a pyramidal construction may be used, particularly where the square top portion provides compaction.

The method of the invention is directed to the sequential processing of the shrimp by first orienting single file, and thereafter orienting with the tails down. As shown with the alternative embodiments of the hydraulic singulator orienter, or the vibratory units, it will be seen that various structures can be employed to achieve the orientation. Once oriented, the shrimp are then passed from a low velocity vertical flow at a T-head type junction to a high velocity horizontal flow. A fulcrum is provided at the junction of the two flows so that the shrimpis literally bent right over the fulcrum at the point where the head separates from the tail. Thereafter the heads are separated from the tails essentially hydraulically by first removing the water from the product effluent which includes separated heads and tails. Thereafter the heads and tails are permitted to slide along a plate having a corrugated surface, and the heads are engaged by a transverse flow of fluid and directed to one side, with the fluid being spaced sufficiently from the deflector plate so that the tails can slide therebeneath and drop off into a different area.

Third Alternative Embodiment

In practice it has been determined that when processing shrimp which varies substantially in size, such as between twenty-one count and sixty count (count being the numbered shrimp per pound), the processing unit, specifically the decapitation apparatus of the present invention requires modifications to accommodate the various sizes of the shrimp. Further modifications as explained below permit loosening of the shells from the decapitated tails to a significant degree so that peeling or removing of the shells is more easily accomplished.

Figure 11:
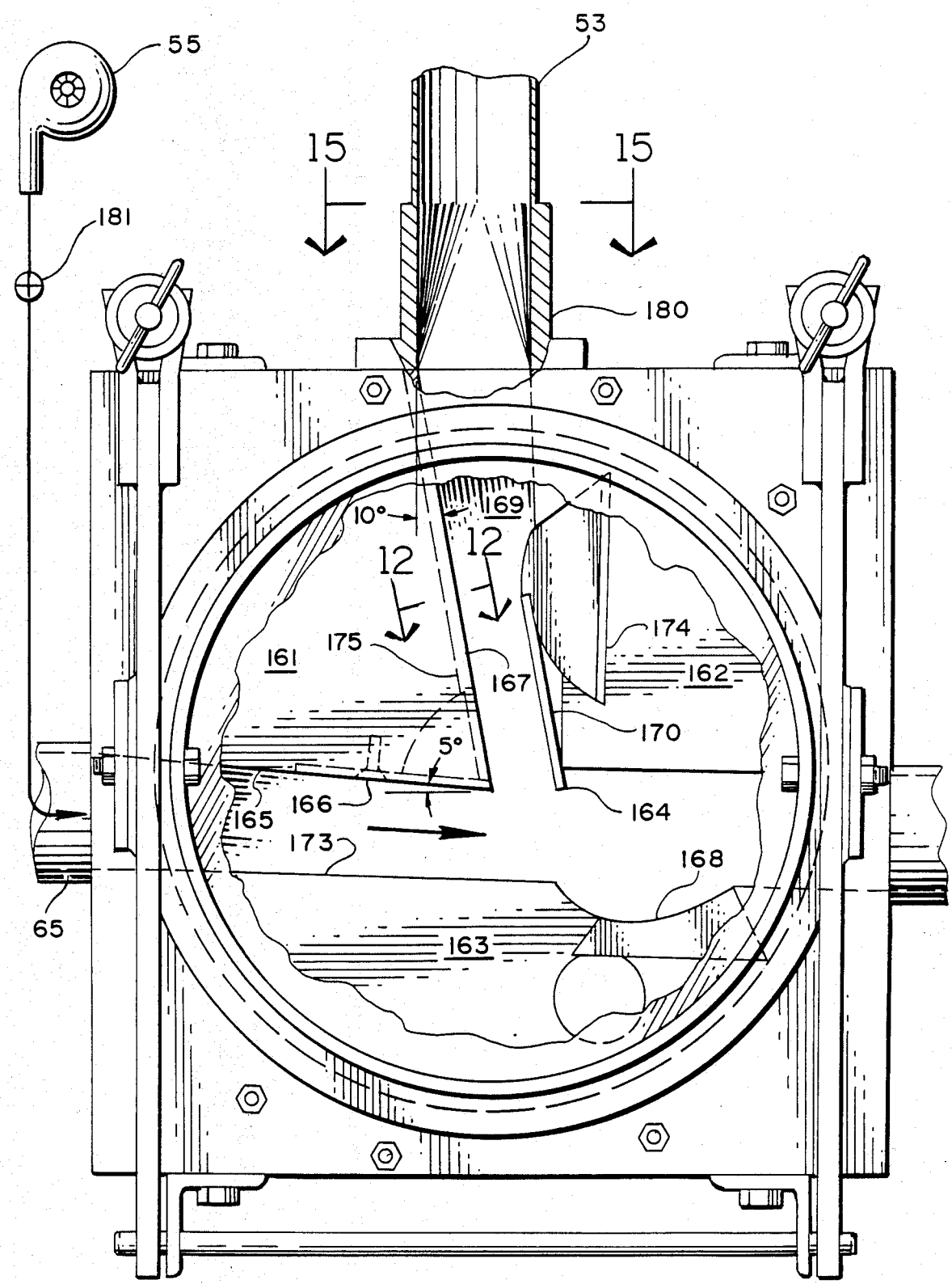
FIG. 11 is a partial plan view of the decapitator apparatus of another embodiment of the present invention for processing shrimp of varying size.

Central to the modifications of this alternative embodiment is the proportioning of the flow path comprising the vertical feeder tube channels 169. As shown in FIG. 11, which view is taken along the same plane as that of FIG. 5, the upper left insert 161 is positioned between the two cover plates and proportioned to have a forward face 167 placed at an angle of approximately 10° with the vertical, and a lower face 165 positioned approximately 5° from the horizontal. The upper right-hand insert 162, which supports the fulcrum plate 170 having fulcrum 164 at the lower end thereof, is provided with a mounting beam 174 to which the fulcrum plate 170 is secured. The upper left and right inserts are proportioned such that the vertical feeder tube channel 169 is formed therebetween and comprises approximately a running one and one-half inches across the top and a one inch distance between the fulcrum 164 and the face 167 of the upper left insert 161 measured perpendicularly between the angled faces of the upper left insert 161 and the fulcrum plate 170. The width between the two cover plates on either side of the insert is approximately one inch. This results in a vertical feeder tube channel 169 having a rectangular entrance of substantially by 1½ inches by one inch and an exit of substantially one inch square. The vertical feeder tube channel 169 thereby divergently tapers from top to bottom.

Figure 15:
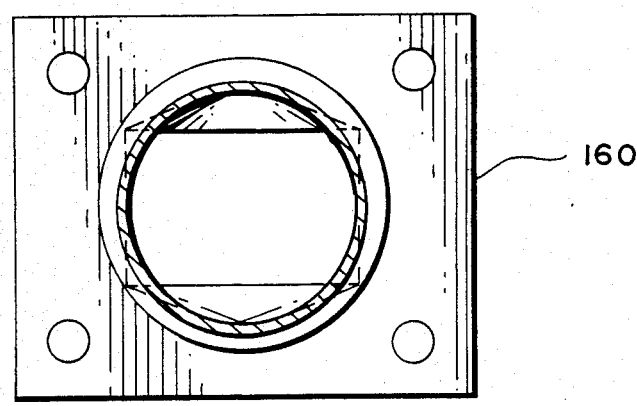
FIG. 15 is a cross-sectional view of the transition flow connector taken along the line 15—15 of FIG. 11.

A transition connector piece 180 is interposed between the end of tubular conduit 53 and the top surface of the decapitator apparatus. The transition connector apparatus 180 is illustrated in FIGS. 11 and 15. The flow opening through transition connector 180 comprises a circular cross-sectional shape at the inlet end thereof and a rectangular cross-sectional shape at the exit end thereof. These shapes connect with the correspondingly similar shapes of conduit 53 and the entrance of the vertical feeder tube channel 169. The flow opening within the transition connector piece 180 smoothly transforms from the circular opening to the rectangular opening.

Referring again to FIG. 11 of the drawings, the bottom insert 163 is provided with an upper face 173 positioned horizontally, and a flow shaper 168 which is curvilinear and positioned with its leading edge substantially in alignment below the fulcrum 164. Thus, in this alternative embodiment the curvilinear portion of slow shaper 168 is positioned substantially downstream of fulcrum 164.

Figure 12:
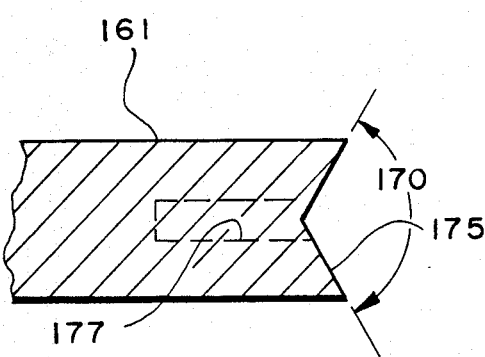
FIG. 12 is a partial cross-sectional view taken along the line 12—12 of FIG. 11.

The vertical feeder tube channel 169 comprising the channel formed by the upper left and right inserts 161 and 162, respectively, serves to allow the passage of shrimp therethrough while maintaining the orientation of the shrimp. It will be remembered that the shrimp are oriented tail down with the underside of the body facing the right insert 162. Maintaining this orientation of the shrimp is important. It has been determined that the feelers or as they are sometimes called the horns attached to the head of the shrimp, especially with large shrimp because the lager the shrimp the larger the horns, tend to disrupt the orientation of the shrimp as provided by the present processing apparatus as previously described as the shrimp pass through the vertical feeder channel 169. To overcome this tendency, horn relief means are provided within channel 169. The upper portion of the vertical feeder tube channel 169, which comprises approximately two-thirds of the length of the channel, is provided with a V-shaped recess 175 as seen in FIG. 12. That is, face 167 of the upper left insert 161 includes an angled cut-out portion 175 having an included angle 170 of approximately 120°. Recess 175, therefore, provides a cut-out within which the long feelers or horns of the shrimp fit as the shrimp pass through the vertical feeder tube channel 169.

Figure 13:
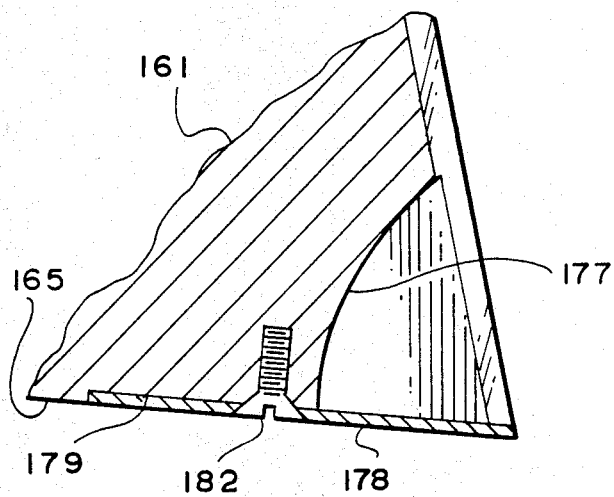
FIG. 13 is a partial cross-sectional view of the exit end of the vertical feeder tube channel arrangement of the embodiment of FIG. 11 illustrating curvilinear relief for the horn portion of shrimp as they are being rotated during the decapitation.
Figure 14:
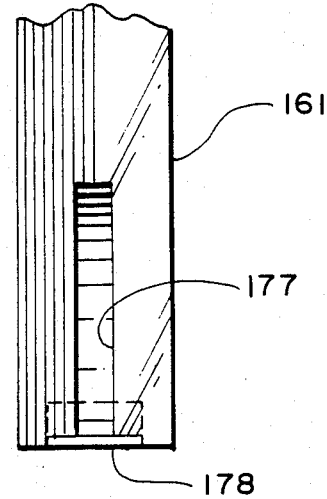
FIG. 14 is a side view of the portion of the apparatus shown in FIG. 13.

At the lower portion of the vertical feeder tube channel 169, for approximately one-third the length thereof, a curvilinear relief slot 177 is provided as shown in FIGS. 13 and 14. Curvilinear slot 177 may be cutout along a radius line of approximately 2¼ inches from the center line of the vertical feeder tube channel 169 and may be approximately ¼" wide. Curvilinear slot 177 provides clearance for the horns of the shrimp as the individual shrimp rotate about the fulcrum 164 immediately prior to separation of the head from the body of the shrimp. Furthermore, curvilinear slot 177 maintains the proper orientation of the shrimp during this phase of the processing so that the desired portion at the back of the head of the shrimp is exactly place against fulcrum 164 so that decapitation may occur.

In order to prevent the water which is rapidly flowing in a horizontal direction within the channel formed by surfaces 165 and 173 of inserts 161 and 163, respectively, from flowing up and within curvilinear slot 177, a foot plate 178 is provided. Without foot plate 178, the horizontal flow would be detracted by curvilinear slot 177 and disrupt the positioning and orientation flow within vertical feeder tube channel 169. The foot plate 178 therefore serves the meaningful purpose of continuing the flow of water vertically within channel 169 into the fulcrum location and yet at the same time permitting the horn of the shrimp to pass downwardly and then outwardly. As shown in FIGS. 13 and 14, foot plate 178 comprises a flat plate fitting within a cutout 179 in the bottom face 165 of the upper left insert 161 and is secured thereto by screw means 182.

In accordance with this alternative embodiment, a further modification of the method and apparatus of decapitating and processing shrimp is provided whereby the water pressure passing from the pump to the main water inlet pipe 65 is regulated by a valve 181 which is downstream of pump 55. With shrimp which have been recently killed, higher pressure is manually and optimally determined and set by the valve provided. With shrimp which may have been dead for a number of hours and which are therefore softer, a lesser pressure is required which lesser pressure is also manually and optimally determined and set by regulating the provided valve. It has been determined, that once the optimum pump pressure has been emperically determined, which pressure is approximately 15 psi with a pressure gauge in perpendicular communication to the pump outlet. Then by raising the pressure by approximately 2 to 3 psi, the increased pressure will cause the shell on the body of a shrimp to substantially separate from the shrimp to a point where very modest manual effort is required to further remove the shell from the decapitated tail of the shrimp.

Although particular embodiments of the invention have been shown and described in full here, there is no intention to thereby limit the invention to the details of such embodiments. On the contrary, the intention is to cover all modifications, alternatives, embodiments, usages and equivalents of the subject invention as fall within the spirit and scope of the invention, specification, and the appended claims.

What is claimed is:

1. A shrimp processor comprising, in combination,
a singulator having a vibratory base and means for containing shrimp randomly dropped thereupon until they pass to an outlet in single file,
an indexer/orientor receiving the subject shrimp from said singulator having a channel portion and a slot in the channel portion engaged by essentially V-shaped slides whereby as the shrimp pass forwardly, the smaller tail portion will drop through the slot,
a hydraulic conduit which receives the indexed/oriented shrimp for transferring the indexed/oriented shrimp to a decapitator,
said decapitator having a vertical downward flow of lower velocity fluid from said hydraulic conduit and a horizontal flow of higher velocity fluid and a fulcrum at the junction of the pathway of such fluids,
and a separator assembly which receives fluid from said decapitator including a product rake to separate the fluid from the heads and tails, and a separator having a transverse spray impinging above an angled baffle which spray is positioned to essentially engage the irregular heads and permit the tails to drop down while the irregular heads are swept laterally across the baffle.

2. In the shrimp processor of claim 1,
pneumatic means for controlling the horizontal flow of fluid in the feed pipe to the decapitator comprising a connection to the venturi portion of the decapitator, and valve means permitting air from zero quantity to maximum acceptable to enter into the venturi portion.

3. In the shrimp processor of claim 1,
automatic means for declogging comprising a jet positioned in the input line to the decapitator directed at the area of the fulcrum,
and means for sensing backpressure in the horizontal flow of fluid which activates the use of a jet directed at the fulcrum area.

4. A method for processing shrimp comprising the steps of:

singulating the shrimp to pass ins ingle file by passing the same substantially horizontally through an opening which will pass only one shrimp at a time, orienting the singulated shrimp to be positioned in a tail-down direction by means of dropping the shrimp one at a time onto a diverging sloped slot, passing the thus-oriented shrimp into a vertical stream of fluid, impinging a horizontal faster stream of fluid on the subject shrimp adjacent a fulcrum, severing the head from the tail fo the shrimp at the fulcrum by impacting the same with fluid travelling at a greater rate than the shrimp is fed to the fulcrum, thereafter shaping the flow with a relieved lower recess to direct the tail upwardly, and thereafter separating the heads and tails.

5. In the method of processing shrimp of claim 4, separating the heads from the tails by means of first removing the water from the effluent of the faster stream by passing it onto a rake, providing the rake with sufficient openings spaced such that they will retain the shrimp tails and heads and permit them to pass downwardly, hydraulically engaging the product laterally with a fan-like spray to remove the irregular and ligher weight heads, and permitting the tails to drop down into a gathering means.

6. A shrimp processor, comprising, in combination, a tank, a hydraulic singulator orientor having a feedway portion for feeding shrimp into said tank full of fluid, a conical cutaway trap interiorly of the tank in which shrimp can drop down the trap whereupon they will naturally present themselves tail down, means for removing the shrimp from the tank in the thus-oriented fashion and for directing the same to a decapitator, a decapitator, and means for separating the heads from the tails after the shrimp have exited the decapitator.

7. In the shrimp processor claim 6, said means for separating including a deflector plate angled witht he vertical for receiving the shrimp tails and heads without the processing water, and spray-like means transverse to said deflector for sweeping the head portions laterally and permitting the tail portions to drop vertically.

8. An hydraulic singulator and orientor for use with a hydraulic decapitator having a velocity head for processing shrimp and equivalent crustation comprising, in combination, a central sink chamber of relatively stagnant fluid, an outer fluid supply chamber having a head of fluid greater than the head of fluid in the sink chamber and surrounding the sink chamber, means for defining said chambers in the form of walls which are imperforate and impervious to leakage of the fluids contained, and means defining an annulus at the lower portion of the sink chamber and the outer fluid supply chamber to provide for a narrow band of fluid to pass downwardly into the velocity head of a decapitator.

9. A method for singulating and orienting shrimp comprising the steps of:

providing a sink chamber of fluid centrally of a vertical singulator and orientor assembly, providing a constant flow of fluid to an outer fluid supply chamber surrounding the sink chamber and maintaining the head of said flowing fluid always greater than that of the head of the fluid in the sink chamber, and coupling the lower portion of the combined sink chamber and fluid supply chamber with means for permitting the thus oriented and singulated shrimp to pass into an hydraulic decapitator.

10. A shrimp decapitator comprising, in combination a hydraulic conduit which receives oriented shrimp oriented tail down and in single file, said decapitator having a vertical flow downward of lower velocity fluid and a horizontal flow of higher velocity fluid and the fulcrum at the junction of the pathway of said fluids, pneumatic means for controlling the flow of fluid in the feed pipe to the decapitator comprising a connection to the venturi portion of the decapitator at the intersection of the slow fluid and the fast fluid, valve means permitting air from zero quantity to maximum acceptable to enter into the venturi portion, and a flow shaper relieved section in the horizontal flow pathway beneath the fulcrum to direct the shrimp tail upwardly.

11. In the decapitator of claim 10, automatic means for declogging comprising a jet positioned in the input line to the decapitator directed at the area of the fulcrum, and means for sensing back pressure in the inlet water side which activate the use of a jet directed at the fulcrum area.

12. For use with a shrimp processor, an indexer/orientor for receiving shrimp one at a time comprising, in combination, an indexer pan having a V-shaped slot in its central portion, a pair of diverging beams oriented beneath the indexer pan for receiving shrimp that are dropped from the pan, said beams being secured in spaced relationship to each other and defining a constantly opening slot therebetween, and means for vibrating the combination of the indexer pan and the diverging beams to constantly urge the shrimp toward the end of the beams where the slot is widest.

13. In the indexer/orientor combination of claim 12, a fluid supplied raceway positioned beneath the diverging beams of the indexer/orientor, and deflectors positioned above the open portion of the raceway to urge the shrimp tail first when entering the raceway while being passed for further processing within the shrimp processor.

14. A shrimp decapitator comprising, in combination a hydraulic means for supplying shrimp in a stream of water oriented tail down, and substantially in single file, a vertical channel for receiving said oriented shrimp in said stream of water and delivering said oriented shrimp to a fulcrum located at a junction at the outlet of said vertical channel and a horizontal channel having a flow of water therein at a higher velocity than said vertical channel, said vertical channel having a diverging flow cross-sectional area, a flow shaper relieved section in the horizontal flow channel to direct the tail of said shrimp upwardly with the entrance of said flow shaper substantially below said fulcrum and the remainder of said flow shaper being located downstream of said fulcrum, relief means in said vertical channel for accommodating the feelers of said shrimp passing through said vertical channel so as to maintain the orientation of said shrimp therewithin and as the tail portion of the shrimp rotates around the fulcrum.

15. In the shrimp decapitator of claim 14, said relief means in said vertical channel comprising a V-shaped groove along one side of said vertical channel for approximately two-thirds the length thereof and a curvilinear groove intersecting with said V-shaped groove for approximating the remaining one-third length thereof.

16. In the shrimp decapitator of claim 14, said diverging vertical flow channel having a substantially rectangular cross-section and the entance thereof and a square cross-section at the exit thereof, and a smooth transition therebetween.

17. In the shrimp decapitator of claim 14, said diverging vertical flow channel being at a vertical angle such that said vertical flow channel and said fulcrum are at an oblique angle to the entrace portion of said horizontal flow channel.

18. A method for processing shrimp comprising the steps of, singulating the shrimp to pass essentially single file downwardly in a vertical feed tube, passing fluid into the vertical feed tube at a rate sufficient to permit the shrimp to flow downwardly tail first, passing a second stream essentially perpendicular to the first stream, positioning a fulcrum at the intersection between the vertical stream and the horizontal stream, and adjusting the pressure of the horizontal stream to at least 15 psi, and optimally increasing said pressure in the range of 2-3 psi to cause the shell on the body of the shrimp to easily separate therefrom.

* * * * *